US009704126B1

(12) United States Patent
Wellman

(10) Patent No.: US 9,704,126 B1
(45) Date of Patent: Jul. 11, 2017

(54) INVENTORY HANDLING BY ANISOTROPICALLY ADHESIVE GRIPPING

(71) Applicant: Amazon Technologies, Inc., Seattle, WA (US)

(72) Inventor: Parris S. Wellman, Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/243,790

(22) Filed: Aug. 22, 2016

(51) Int. Cl.

| | |
|---|---|
| ***G06F 7/00*** | (2006.01) |
| ***G06Q 10/08*** | (2012.01) |
| ***G05B 19/402*** | (2006.01) |
| ***B25J 9/16*** | (2006.01) |
| ***B25J 15/00*** | (2006.01) |

(52) U.S. Cl.
CPC .......... *G06Q 10/087* (2013.01); *B25J 9/1612* (2013.01); *B25J 9/1669* (2013.01); *B25J 15/008* (2013.01); *G05B 19/402* (2013.01); *G05B 2219/39466* (2013.01); *Y10S 901/30* (2013.01)

(58) Field of Classification Search
None
See application file for complete search history.

(56) References Cited

U.S. PATENT DOCUMENTS

| | | | |
|---|---|---|---|
| 5,871,248 A * | 2/1999 | Okogbaa .................. | B25J 15/00 294/86.4 |
| 6,872,439 B2 | 3/2005 | Fearing et al. | |
| 2005/0151385 A1 * | 7/2005 | Autumn ................ | B08B 7/0028 294/86.4 |
| 2016/0137435 A1 * | 5/2016 | Tanaka ................... | B65G 37/00 414/564 |

OTHER PUBLICATIONS

Estrada, et al. "Free-Flyer Acquisition of Spinning Objects with Gecko-Inspired Adhesives," *Proceedings of IEEE International Conference on Robotics and Automation* (May 2016), 7 pages.
Hawkes et al., "Grasping without Squeezing: Shear Adhesion Gripper with Fibrillar Thin Film," *Proceedings of IEEE International Conference on Robotics and Automation* (May 2015), 8 pages.
Jonschkowski et al., "Probabilistic Multi-Class Segmentation for the Amazon Picking Challenge," *Technical Report RB0-2016-01*, Department of Computer Engineering and Microelectronics, Technische Universität Berlin, (Feb. 2016), 8 pages.

* cited by examiner

*Primary Examiner* — Yolanda Cumbess
(74) *Attorney, Agent, or Firm* — Kilpatrick Townsend & Stockton LLP

(57) ABSTRACT

Robotic inventory handlers can include two or more gripping elements connected with a lifting assembly. The gripping elements can be subjected to outward lateral force when in contact with inventory items such that the anisotropically adhesive surface engages an inventory item with an adhesive force. Inventory systems can employ robotic inventory handlers as described to lift and displace inventory items using the adhesive force.

20 Claims, 16 Drawing Sheets

100
106
120
108
110
122
112
116
132
114
118
104
128
124
130
126
102

100
108
120
110
136
136
122
112
134
116
114
118
140
124
128
130
126
142
104
138
138
102
144

200

238
206
250
240
214
216
242
210
208
224
212
218
220
244
222
226
230
204
246
234
248
228
236
232
202

300
306
308
310
314
316
312
318
322
330
304
326
332
320
324
334
328
302

400
406
408
410
412
430
434
432
426
428
414
420
416
422
404
436
438
444
448
450
416
440
418
424
442
402

500
516
514
506
504
518
508
510
512
502

500
506
522
514
516
518
508
512
504
520
526
502
510

600
106
100
136
136
112
116
134
114
118
604
608
124
610
606
612
126
644
602

700
100
106
136
136
112
116
134
114
118
706
704
710
124
126
708

100
800
106
112
116
114
118
124
828
830
126
804
802

136
136
134
112
116
114
118
140
142
828
830
124
126
804
802

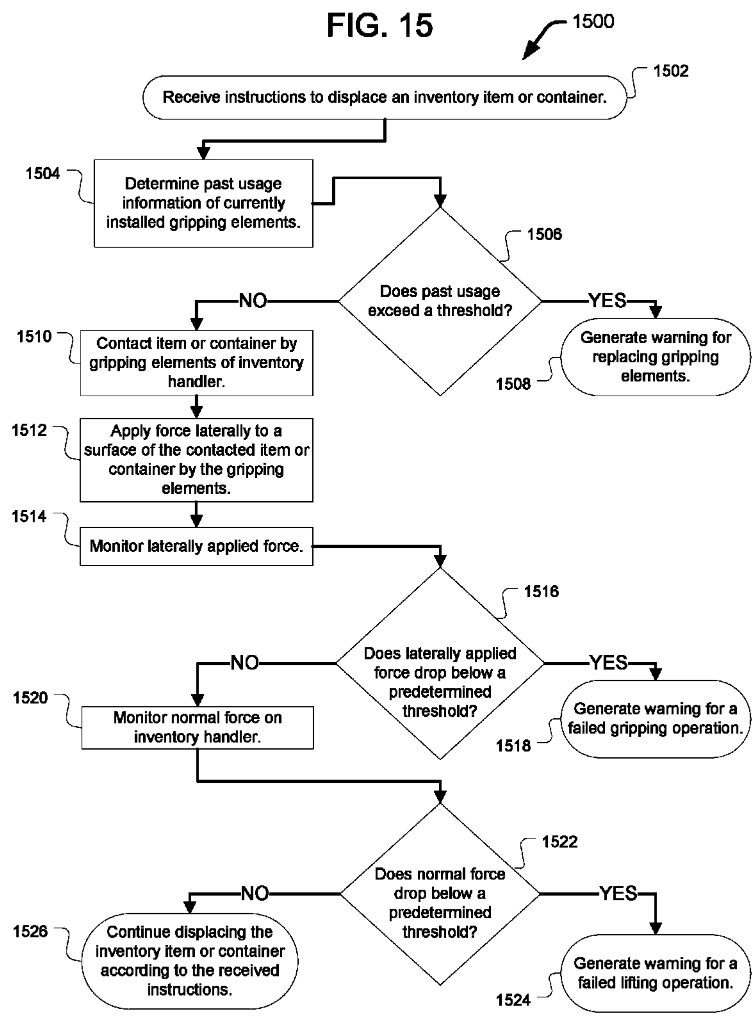
FIG. 15
1500
Receive instructions to displace an inventory item or container.
1502
1504
Determine past usage information of currently installed gripping elements.
1506
Does past usage exceed a threshold?
NO
YES
1510
Contact item or container by gripping elements of inventory handler.
Generate warning for replacing gripping elements.
1508
1512
Apply force laterally to a surface of the contacted item or container by the gripping elements.
1514
Monitor laterally applied force.
1516
Does laterally applied force drop below a predetermined threshold?
NO
YES
1520
Monitor normal force on inventory handler.
Generate warning for a failed gripping operation.
1518
1522
Does normal force drop below a predetermined threshold?
NO
YES
1526
Continue displacing the inventory item or container according to the received instructions.
Generate warning for a failed lifting operation.
1524

1600
Client Device
1602
Network(s) 1604
1606
Web Server
Application server
1608
Resource Scheduling Information 1612
Segment Reservation Information 1616
Route Planning Information 1614
Inventory Information 1618
Data Store 1610

INVENTORY HANDLING BY ANISOTROPICALLY ADHESIVE GRIPPING

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

Inventory systems can enhance throughput by efficiently using space and by employing automation, including robotic means to lift and place inventory. One heretofore significant drawback in such automation has been the difficulty that robotic inventory handlers have in manipulating objects that are irregularly shaped, irregularly positioned, or collapsible. For example, known robotic handlers such as a forklift can lift and move objects on pallets, but cannot manipulate objects that are positioned directly on an inventory floor or stacked directly on other objects. By way of another example, known robotic handers that grip an object from the sides cannot manipulate objects that deform when gripped, or objects that are packed closely side-by-side with other objects.

BRIEF DESCRIPTION OF THE DRAWINGS

Various embodiments in accordance with the present disclosure will be described with reference to the drawings, in which:

FIG. 15 illustrates another example process for handling an inventory item or container, in accordance with embodiments.

DETAILED DESCRIPTION

Figure 1:
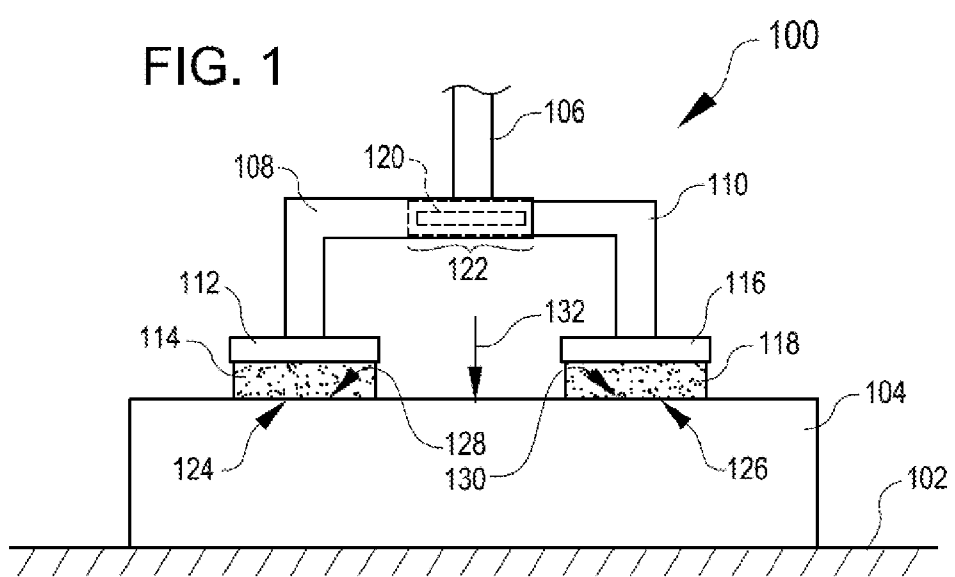
FIG. 1 is a simplified diagrammatic illustration of a first example of an inventory handler including a gripping assembly having anisotropically adhesive gripping elements, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Modern inventory systems deal with a large variety of inventory items, therefore automated handling system capable of handling many different types of containers and loose items is desirable. Conventional gripping devices generally require that containers or loose items be spaced apart, or placed on pallets or in specialized containers, so that grasping devices or lifting devices can be placed around or underneath the containers or items. However, in order to achieve high packing density of inventory items during intermediate storage, it is useful to be able to pick up containers or items without needing to access more than one side, because then the containers or items may be stowed with little or no space between them. One conventional solution to this problem is the use of vacuum grippers. However, vacuum grippers won't function for a variety of cases, such as with porous materials, geometries that lack a large enough flat spot to apply the suction cup, or materials that easily deform or crush.

Certain surface microstructures known as fibrillary thin films have been developed that can exhibit adhesive properties under strain. The adhesive properties are exhibited anisotropically, i.e., the exertion of a tangential or shear force between the film and an object can result in adhesion of the film to the object, while release of the shear force releases the adhesive force. Examples of fibrillary thin films are described in the following references: U.S. Pat. No. 6,872,439, entitled, "Adhesive Microstructure and Method of fabricating Same"; in Estrada et. el., Free-Flyer Acquisition of Spinning Objects with Gecko-Inspired Adhesives, *Proceedings of IEEE ICRA* 2016; and in Hawkes et. al., Grasping without Squeezing: Shear Adhesion Gripper with Fibrillar Thin Film, *Proceedings of IEEE ICRA* 2015. The aforementioned references are herein incorporated by reference. In experiments described in the above-referenced publications, grasping and capturing of lightweight convex shapes by adhesive films that wrap partly around the convex shapes has been described.

Embodiments herein are directed to an inventory system that employs inventory handlers using anisotropically adhesive gripping elements. The inventory system can include an inventory facility having inventory disposed in inventory holders and inventory containers, or as bagged inventory and loose inventory. Robotic handlers are operable to lift and displace some or all of the above-referenced types of inventory. Gripper assemblies attached with the robotic handlers include anisotropic adhesive elements that exert an adhesive force when the adhesive elements are undergoing lateral strain, and do not exert the adhesive force when the adhesive elements are not undergoing lateral strain. Inventory management systems can employ one or more robotic handlers for autonomously or semi-autonomously carrying out inventory management tasks, such as displacing designated inventory from one location to another.

FIG. 1 is a simplified diagrammatic illustration of a first example of an inventory handler 100 including anisotropically adhesive gripping elements 114, 118, in accordance with embodiments. The inventory handler 100 is shown in conjunction with an inventory item 104 on a floor 102 of an inventory facility. The inventory handler 100 includes a lifting assembly 106 that may be connected with an overhead unit, robotic arm, crane, or other suitable means for lifting and displacing the inventory handler. An actuator 120, which may include a linear actuator or other suitable mechanical actuator, is connected with linkages 108, 110 that connect the lifting assembly 106 with the gripping elements 114, 118. The gripping elements 114, 118 are connected with the linkages 108, 110 by structural parts 112, 116.

The gripping elements 114 and 118 can include anisotropically adhesive surfaces 124, 126, which comprise fine microstructures forming hairs that interact with surfaces when the surfaces are under shear. The anisotropically adhesive surfaces may be constructed in similar manner to the adhesive films described in U.S. Pat. No. 6,872,439. The fine microstructures may be molded in silicone rubber or other moldable polymer, or may be formed in other suitable materials including metals and carbon. In general, anisotropically adhesive surfaces can generate up to 50 N of adhesive force per square centimeter when subjected to nominal shear stresses of as little as about 1 $N/cm^2$. Preferably, embodiments of anisotropic gripper elements herein described can generate between 5 $N/cm^2$ and 50 $N/cm^2$ of adhesive force in response to shear loading of between 1 and 50 $N/cm^2$.

The gripping elements 114, 118 can be deformable between the adhesive surfaces 124, 126 and the structural parts 112, 116, such that the adhesive surfaces 124, 126 can more readily assume the shape of a contact surface. The gripping elements 114, 118 may also be removably attached with the structural parts 112, 116, so that the gripping elements 114, 118 can be readily replaced if the adhesive surfaces 124, 126 become worn, damaged, or fouled. Gripping elements 114, 118 may be attached with the structural parts 112 by any suitable releasable connector, including mechanical connectors such as bolts or pins; or may be more permanently connected, e.g. by way of rivets, adhesives, or similar.

In operation, the inventory handler 100 is lowered to contact the inventory item 104 at contact surfaces 128, 130. The contact surfaces 128, 130 can be on the same side of the item, and can be oriented roughly parallel to one another, or may be inclined toward one another, as in a concave surface. Before the inventory handler 100 has lifted the inventory item 104, there may be overlap 122 between the linkages 108, 110 so that the linkages can move relative to one another. The inventory handler 100 can be pressed into the inventory item 104 with a nominal normal force 132, which need only be sufficient to put the adhesive surfaces 124, 126 in contact with the inventory item.

Figure 2:
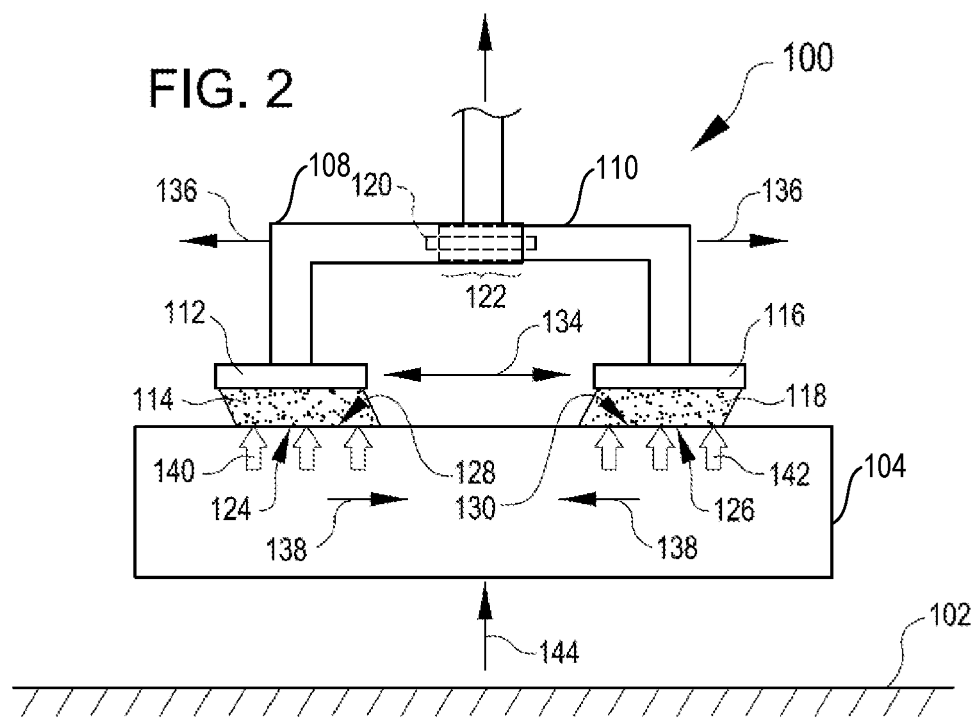
FIG. 2 is a simplified diagrammatic illustration of the inventory handler of FIG. 1 performing a lifting operation.

FIG. 2 is a simplified diagrammatic illustration showing in more detail how the inventory handler 100 of FIG. 1 engages the inventory item 104. For example, in operation, the inventory handler 100 subjects the gripping elements 114, 118 to a lateral separating force 134. The separating force 134 may be achieved by causing an outward force 136 to separate the linkages 108, 110, e.g. by the actuator 120. A change in a linkage overlap 122 and deformation of the gripping elements 114 are shown in exaggerated form for the purpose of clarifying the directionality of forces.

The separating force 135 causes the adhesive surfaces 124, 126 to adhere to the contact surfaces 128, 130 of the inventory item 104. Any surface of the inventory item can be used as a contact patch provided it is flat enough to contact the adhesive surfaces 124, 126. The separating force 135 in conjunction with the adhesive forces 140, 142 causes the gripping elements 114, 118 to transfer surface tension 138 into the inventory item. By causing tension rather than compression, the inventory handler 100 is capable of lifting items that may otherwise have been unsuited for robotic handling. In particular, by holding the surface of items in tension rather than compression or pinching, the inventory holder 100 can readily hold loose items or items that are enclosed in flaccid packaging. Grippers that operate by compression or pinching may be unable to reliably grasp loose items or items contained in flaccid packaging because, when such grippers engage an item or package, the loose material of the item or package simply moves inward with the grippers. When operating in tension, grippers can instead generate a lateral tensile force in the loose item or packaging, which is sufficient to engage an anisotropic adhesive.

The mode of gripping a flaccid item or packaging by lateral tension is counterintuitive compared to conventional methods of gripping such items. For example, in human terms, a loose item or package might be grasped by gripping with the fingers and pinching a portion of the item or packaging. Such pinching can occasionally cause damage to items or packages, and may not be secure. Robotic graspers may be especially susceptible to damaging or improperly releasing grasped items, because robotic graspers are limited in terms of their ability to dynamically sense and adjust pressure. Conversely, the mode of gripping by lateral tension would be analogous to placing one's fingertips on a surface of the item or package, and then spreading out the fingertips to spread the surface of the item or package until it is tight in tension. This mode of gripping by lateral tension tends to consistently provide suitable contact surfaces on a flaccid item or package surface for the anisotropic adhesive surfaces of a gripping element to adhere.

Furthermore, the magnitude of the adhesive force 140 can be substantially decoupled from the amount of lateral separating force 134, such that a relatively small lateral separating force is sufficient to generate the adhesive force. When the lateral separating force 134 is increased from zero to a predetermined threshold, the amount of adhesive force 140 that can be exerted by the gripping elements 114 is increased from zero to a nominal value. Provided the lateral separating force 134 is maintained at or above the threshold value, the magnitude of the adhesive force 140 is substantially constant. Rather, the magnitude of the adhesive force 140 is dependent in large part on a surface area of contact between the adhesive surfaces 124, 126 and the contact surfaces 128, 130. The lifting force 144 that can be generated by the inventory handler 100 can be increased by increasing an area of contact between the adhesive surfaces 124, 126 and the inventory item 104.

Two gripping elements 114, 118 are shown, however, it will be understood that any suitable number of gripping elements may be provided. In general, gripping elements will include opposing, or symmetrical, pairs or groups of gripping elements so that inventory items are lifted in a balanced manner from multiple regions. While gripping elements will be configured to separate and move away from one another, they do not necessarily have to move directly away from one another. For example, three gripping elements may be employed, wherein each gripping element is arranged to move away from a central region, and at an angle away from the three gripping elements. Where three gripping elements, or any other odd number of gripping elements, are used, the gripping elements may be positioned in a rotationally symmetrical fashion.

Figure 3:
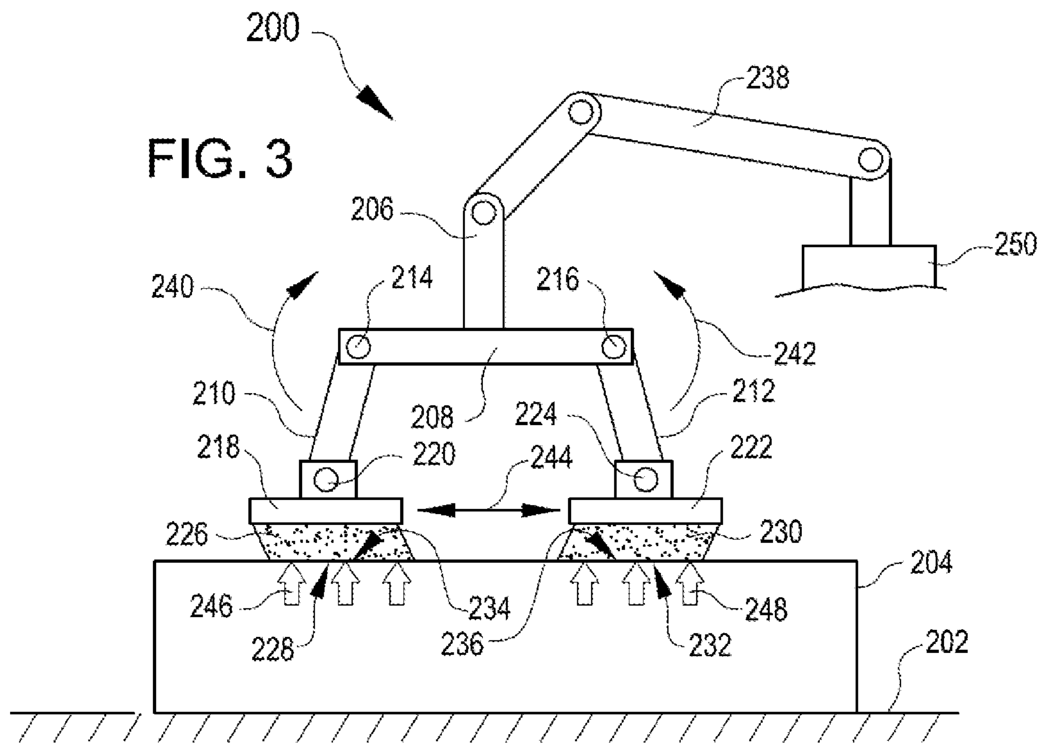
FIG. 3 is a simplified diagrammatic illustration of a second example of an inventory handler including a gripping assembly having anisotropically adhesive gripping elements in conjunction with an articulated robotic arm, in accordance with embodiments.

FIG. 3 is a simplified diagrammatic illustration of a second example of an inventory handler 200 including anisotropically adhesive gripping elements 226, 230 in conjunction with an articulated robotic arm 238, in accordance with embodiments. The inventory handler 200 is shown in conjunction with another inventory item 204 on a facility floor 202. The inventory handler 200 includes a lifting assembly 206 that is connected with the robotic arm 238 in order to lift and displace inventory items. The articulated robotic arm 238 may be connected with a base unit 250 that supports the articulated robotic arm, and can connect to an automated or semi-automated inventory management system (see FIGS. 12-13).

As described with respect to the inventory handler 100 of FIG. 1, the inventory handler 200 can exert a lateral separating force 244 on the gripping elements 226, 230. The gripping elements 226, 230 are shown in contact, via anisotropically adhesive surfaces 234, 236, with the contact surfaces 134, 236 of the inventory item 204. While in shear, the adhesive surfaces 234, 236 provide strong adhesive forces 246, 248 between the gripping elements 226, 230 and the inventory item 204.

The lateral separating force 244 may be generated by linkages 210, 212 being forced apart, e.g. by rotational forces 240, 242 exerted at rotational connections 214, 216 between the linkages and the lifting assembly 206. For example, the rotational connections 214, 216 can include rotational actuators. Suitable rotational actuators can include any suitable actuator for engaging a consistent degree of force, and may include impedance controllers or similar devices.

The linkages 210, 212 can be connected with the gripping elements 226, 230 by way of structural parts 218, 222 that attach with the gripping elements. In some cases, the structural parts 218, 222 may include secondary rotational connections 220, 224, which can balance rotation of the linkages 210, 212 relative to the inventory item 204, so that the adhesive surfaces 324, 326 are prevented from peeling away from the contact surfaces 234, 236. In some cases, the gripping elements 226, 230 may be permitted to rotate away from one another so as to remain fully in contact with a non-rigid surface of the inventory item, e.g. when the inventory item is a soft or pliable inventory item such as a bag.

Figure 4:
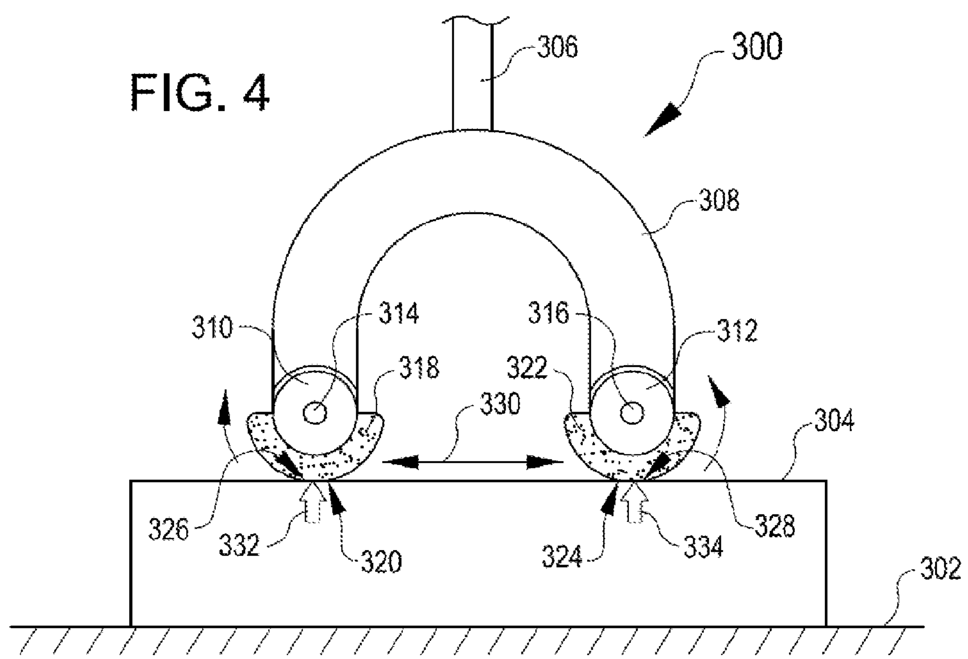
FIG. 4 is a simplified diagrammatic illustration of a third example of an inventory handler including a gripping assembly having anisotropically adhesive gripping elements arranged on rotatable substrates, in accordance with embodiments.

FIG. 4 is a simplified diagrammatic illustration of a third example of an inventory handler 300 including a gripping assembly having anisotropically adhesive gripping elements 318, 332, arranged on rotatable substrates 310, 312, in accordance with embodiments. The inventory handler 300 includes a lifting assembly 306 that may be connected with any suitable means for lifting and/or translating the inventory handler. A linkage 308 is connected with the lifting assembly 306 and gripping elements 318, 332. In some cases, the linkage 308 may be rigid. In some other cases, the linkage 308 may be flexible.

The linkage 308 terminates at two spaced-apart rotatable substrates 310, 312, which may be connected with the linkage by two or more rotational actuators 314, 316 configured to rotate the substrates and concomitantly rotate the gripping elements 318, 322. The gripping elements 318, 322 possess anisotropically adhesive surfaces 320, 324 thereon, which are arranged facing outward from the rotatable substrates 310, 312 in order to contact the inventory item 304. The gripping elements 318, 322 may comprise a deformable material, such that the gripping elements can deform while in contact with the inventory item 304 to increase an amount of contact area between the adhesive surfaces 320, 324 and the contact surfaces 326, 328 of the inventory item 304.

In operation, the inventory handler 300 can be lowered into contact with the inventory element 304 such that the adhesive surfaces 320, 324 contact the contact surfaces 326, 328 of the inventory item 304. Only a nominal normal force is required for contact, being sufficient to engage the adhesive surfaces 320, 324 with the contact surfaces 326, 328. The rotational actuators 314, 316 can cause the gripping elements 318, 322 to rotate away from one another, i.e. generating a lateral separating force 330 at the contact surfaces 326, 328. When placed in shear in this manner, the adhesive surfaces 320, 324 generate an adhesive force 332, 334 capable of supporting the weight of the inventory item 304.

Figure 5:
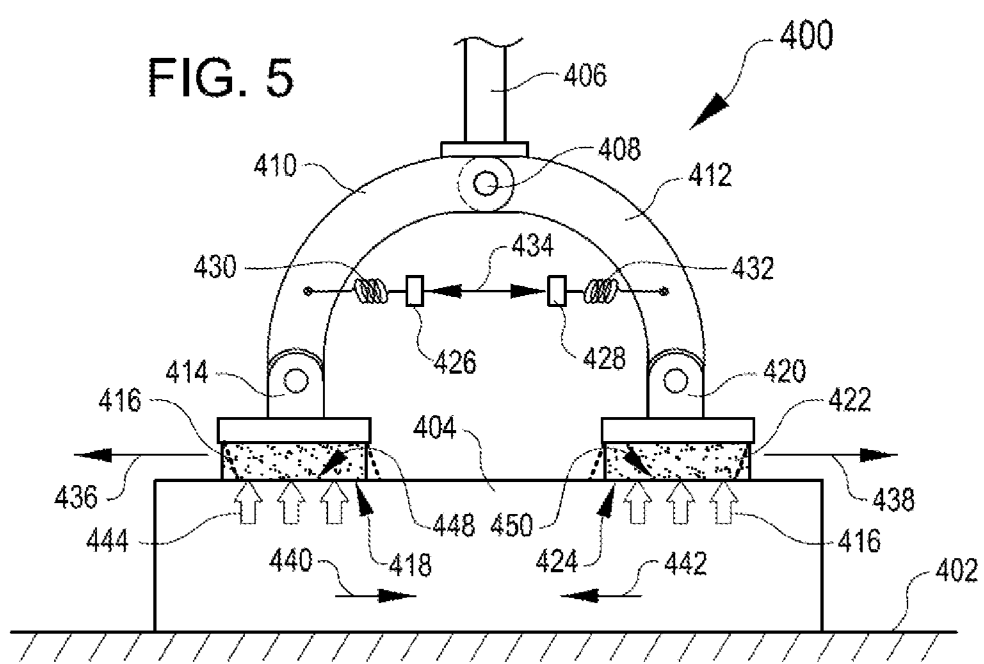
FIG. 5 is a simplified diagrammatic illustration of a fourth example of an inventory handler including a gripping assembly having anisotropically adhesive gripping elements employing elastic stabilization, in accordance with embodiments.

FIG. 5 is a simplified diagrammatic illustration of a fourth example of an inventory handler 400 including a gripping assembly having anisotropically adhesive gripping elements 416, 422 and employing elastic stabilization. The inventory handler 400 is shown in conjunction with another inventory item 404 on a facility floor 402. The inventory handler 400 includes a lifting assembly 406 that may be connected with any suitable means for lifting and/or translating the inventory handler. Linkages 410, 412 are rotatably connected with one another and with the lifting assembly 406 at a pivot point 408. The pivot point may include a rotational actuator operable to rotate the linkages 410, 412 away from one another.

The linkages 410, 412 can each be connected with elastic stabilizers 430, 432 for providing the linkages with some passive flexibility in response to external forces. For example, when in operation, the linkages 410, 412 can be separated at the elastic stabilizers 430, 432 by a lateral separating force 434. The lateral separating force 434 at the elastic stabilizers 430, 432 is transferred into separating forces 436, 438 at the gripping elements 416, 422. The elastic stabilizers 430, 432 can compress under the lateral separating force 434, causing attachment points 426, 428 to separate by a greater distance than the gripping elements 416, 422. The elastic stabilizers 430, 432 can absorb small changes in displacement between the gripping elements 416, 422 without allowing the separating forces 436, 438 at the gripping elements to fall suddenly in response to said small changes in displacement.

In operation, the spreading forces 436, 438 act to induce shear 440, 442 between the adhesive surfaces 418, 424 of the gripping elements 416, 422 and the contact surfaces 448, 450 of the inventory item 404. The shear 440, 442 causes the adhesive surfaces 418, 424 to engage contact surfaces 448, 450 of the inventory item 404 with adhesive forces 444, 416 sufficient to lift the inventory item 404.

Figure 6:
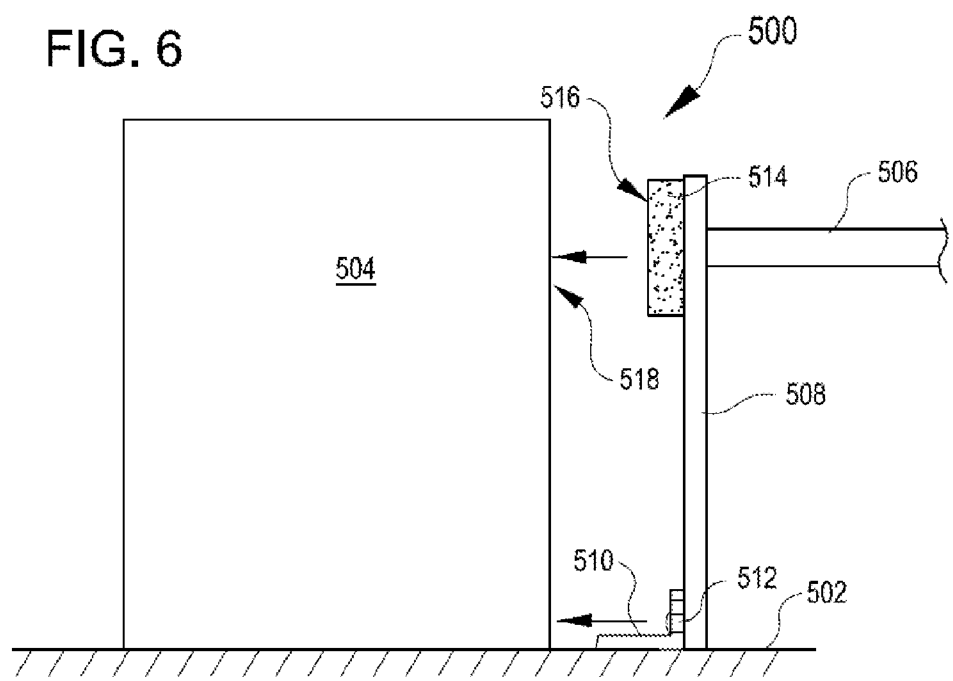
FIG. 6 is a simplified diagrammatic illustration of a fifth example of an inventory handler including a gripping assembly having an anisotropically adhesive gripping element in conjunction with a mechanical support, in accordance with embodiments.
Figure 7:
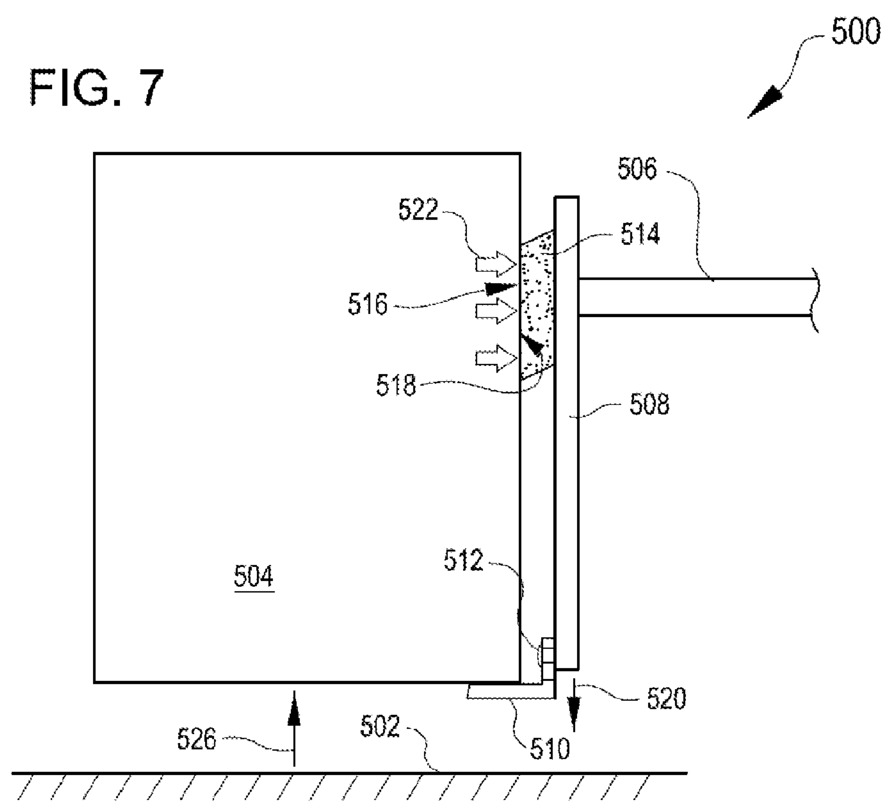
FIG. 7 is a simplified diagrammatic illustration of the inventory handler of FIG. 6 performing a lifting operation.

FIGS. 6 and 7 illustrate a fifth example of an inventory handler 500 including a gripping assembly having an anisotropically adhesive gripping element 514 in conjunction with a mechanical support 510. In embodiment described above, inventory handlers were operable to engage inventory items from above by contacting the inventory items from a top surface with two or more gripping elements possessing anisotropically adhesive surfaces. In the inventory handler 500 shown in FIGS. 6 and 7, the gripping element 514 is configured to engage a side 518 of an inventory item 504. The inventory handler 500 may be particularly useful for grasping or placing articles in an inventory system that are stored without clear access from above, e.g. in a container, a shipping truck, or the like.

The inventory handler 500 includes a lifting assembly 506 and a vertical element 508 that is connected with and separates the gripping element 514 from the mechanical support 510. The mechanical support 510 may be connected with the vertical element 508 by a sliding or elastic connector 512 such that the mechanical support 510 can displace at least slightly when under load.

In operation, the inventory handler 500 can be pressed against the side 518 of the inventory item 504, such that the mechanical support 510 supportively engages the inventory item between the inventory item and the floor 502. When the gripping element 514 contacts the inventory item 504, an anisotropically adhesive surface 516 contacts the side 518 of the inventory item. As shown in FIG. 7, when the inventory handler 500 is lifted, the mechanical support 510 can displace by a small distance 520 allowing the gripping element 514 to be placed in shear, causing the adhesive surface 518 to generate an adhesive force 522 on the inventory item 504. The mechanical support 510 can provide lifting force 526 sufficient to lift the inventory item 504 while the gripping element 514 provides the adhesive force 522 that securely retains the inventory item.

Various embodiments of inventory handlers have been described above with respect to FIGS. 1-7. Features of each example may be combined or omitted in alternative inventory handlers without deviating from the spirit of the invention. Accordingly, gripping elements employing anisotropically adhesive surfaces, as described above, may be employed using any of the above-referenced exemplary configurations or any combination of the exemplary configurations. Anisotropically adhesive gripping elements generally produce a consistent adhesive force when placed under sufficient shear irrespective of the amount of shear force generated on the adhesive surfaces. Thus, very strong adhesive forces can be generated with nominal shear, and without risking damage to an inventory item being retained by the adhesive forces. The anisotropically adhesive gripping elements release completely when the shear is reduced below a predetermined level, such that loose inventory items and inventory items in flexible containers or bags can be grasped without risk of damage to the items or containers. Furthermore, because the gripping elements can produce shear by putting tension in the inventory items rather than compression, inventory handlers can grasp loose or amorphous items and packages without pinching or collapsing the items or packages.

Figure 8:
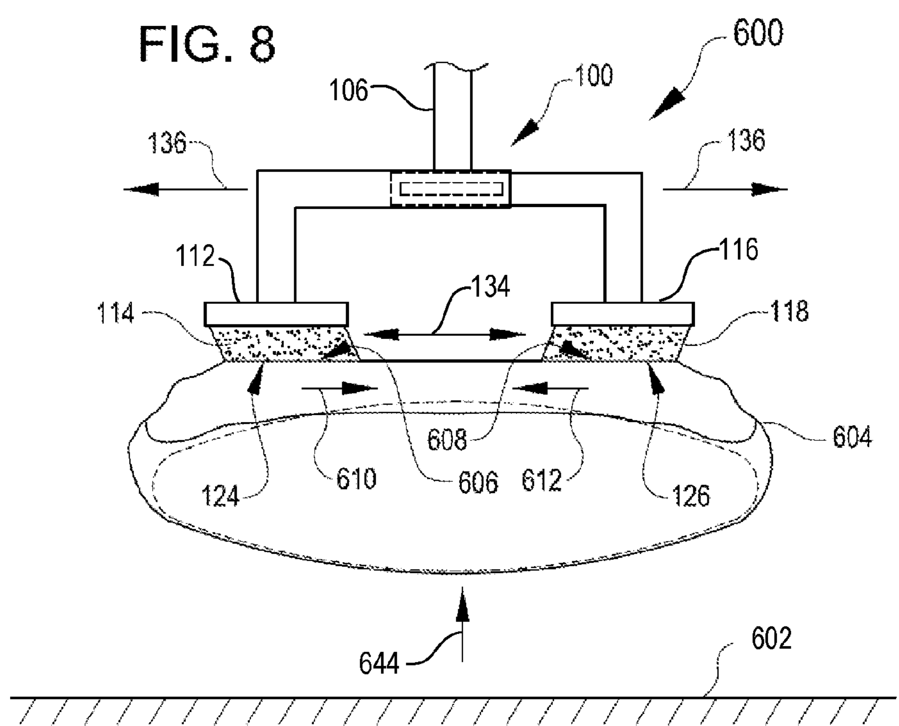
FIG. 8 illustrates the inventory handler of FIG. 1 lifting an amorphous package.

For example, FIG. 8 illustrates the inventory handler 100 of FIG. 1 lifting an amorphous package 604 in an inventory system 600, in accordance with embodiments. The amorphous package 604 can represent any amorphous or crushable bagged item, such as a pillow, a bag of seed or soil, or similar article. When the inventory handler 100 generates the separating force 134 between the gripping elements 114, 118, the adhesive surfaces 124, 126 pull laterally on the contact surfaces 606, 608 of the inventory item 604. In response, tension is generated in the inventory item 604 that causes the shear forces 610, 612 at the contact surfaces 606, 608 of the inventory item. The shear forces 610, 612 are sufficient to cause adhesion between the gripping elements 114, 118 and the contact surfaces 606, 608 sufficient to retain the inventory item 604 and cause a lifting force 644 sufficient to lift the inventory item.

Figure 9:
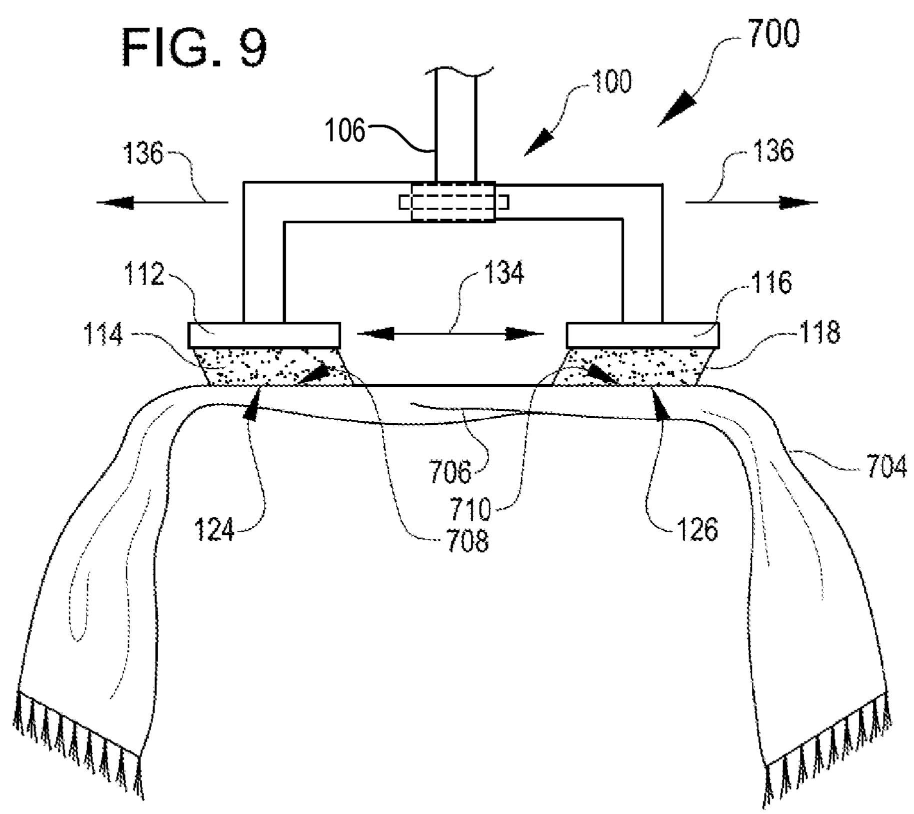
FIG. 9 illustrates the inventory handler of FIG. 1 lifting a loose inventory article.

FIG. 9 illustrates the inventory handler 100 of FIG. 1 lifting a loose inventory article 704 in an inventory system 700, in accordance with embodiments. The loose inventory article 704 can represent any loose rigid or non-rigid object, such as a garment (e.g. a scarf as shown). When the inventory handler 100 generates the separating force 134 between the gripping elements 114, 118, the adhesive surfaces 124, 126 pull laterally on the contact surfaces 708, 710 of the inventory item 704. In response, tension is generated in the inventory item 704 in a region 706 between the contact surfaces 708, 710.

Figure 10:
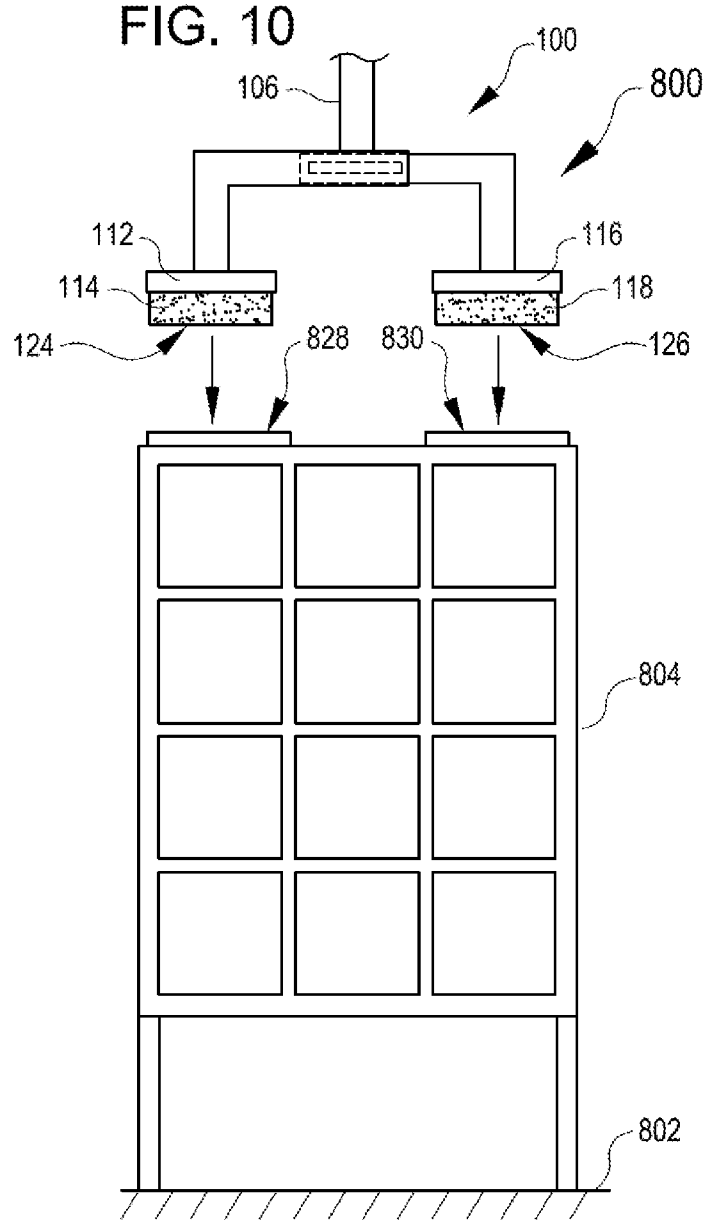
FIG. 10 illustrates the inventory handler of FIG. 1 engaging an inventory holder.
Figure 11:
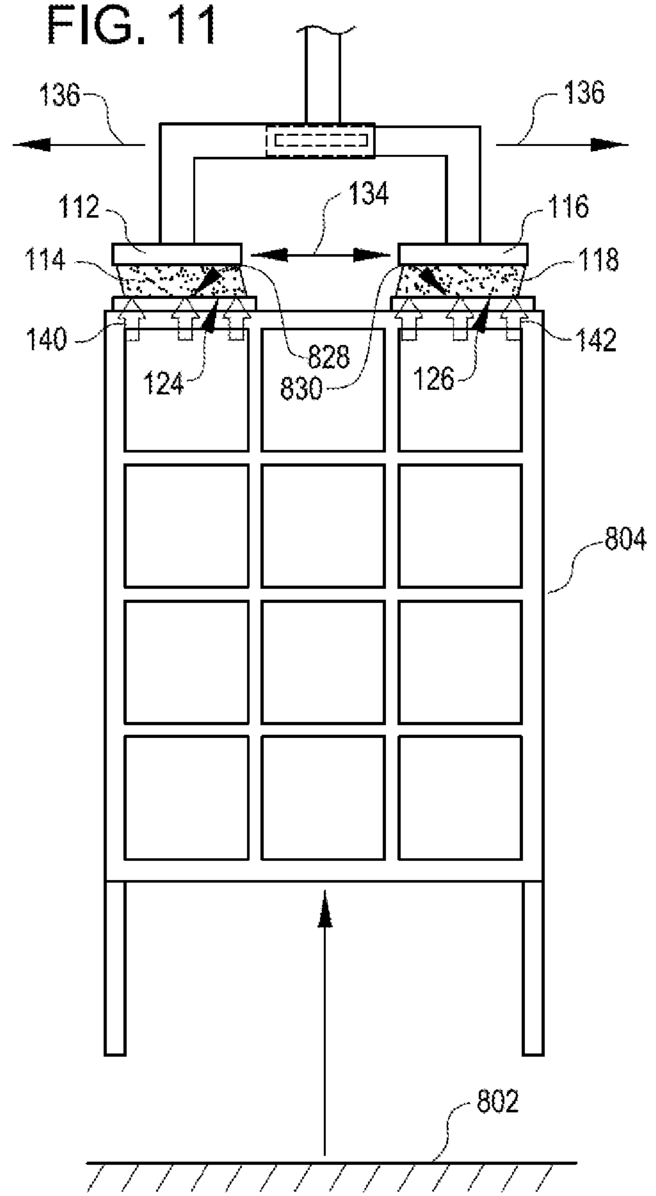
FIG. 11 illustrates the inventory handler of FIG. 1 lifting the inventory holder of FIG. 10.

FIGS. 10-11 illustrate the inventory handler 100 of FIG. 1 engaging an inventory holder 804 in an inventory system 800, in accordance with embodiments. The inventory holder 804 can be situated on a facility floor 802, and preferably possesses contact surfaces 828, 830 that are sufficient to support a weight of the inventory holder. In operation, the inventory handler 100 can be lowered into contact with the contact regions 828, 830 such that adhesive surfaces 124, 126 of the gripping elements 114, 118 fully contact the contact regions. As shown in FIG. 11, the separating force 134 that separates the gripping elements 114, 118 generates shear between the anisotropically adhesive surfaces 124, 126 of the gripping elements and the contact surfaces 828, 830 of the inventory holder 804. The shear causes the adhesive surfaces 124, 126 to adhere to the contact surfaces 828, 830 with adhesive forces 140, 142 that are related to a surface area of contact between the surfaces, and substantially decoupled from the degree of the separating force 134. The adhesive forces 140, 142 are sufficient to lift the inventory holder 804, and are fully reversible.

Figure 12:
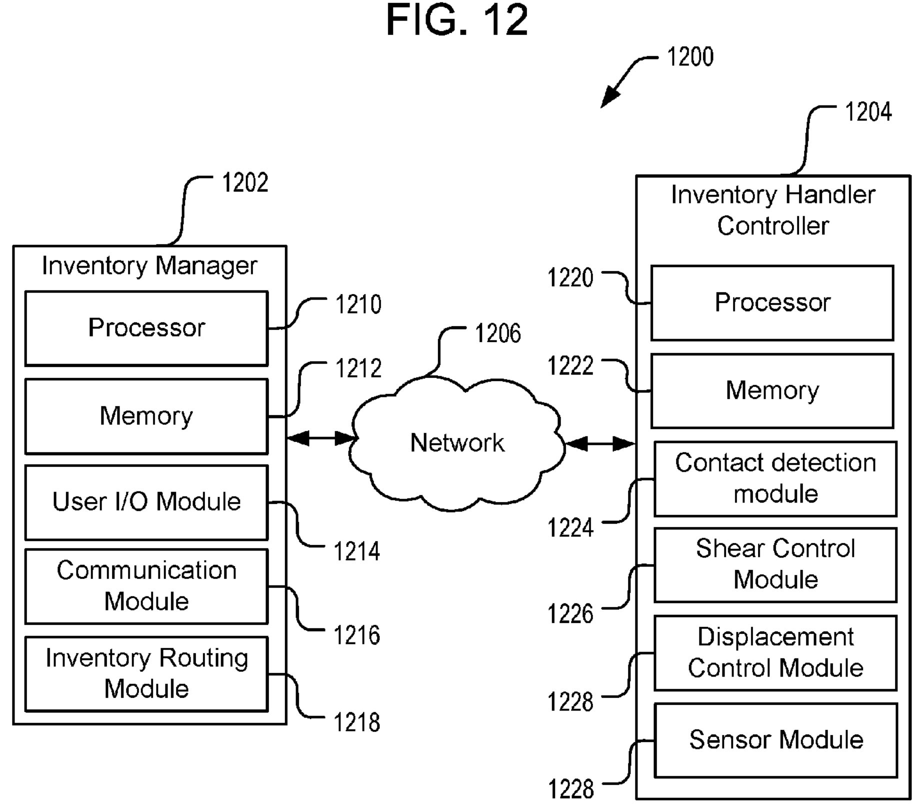
FIG. 12 is a simplified schematic diagram illustration of a system for controlling an inventory handler in an inventory system, in accordance with embodiments.

FIG. 12 is a simplified schematic diagram illustration of a system 1200 for controlling an inventory handler in an inventory system, in accordance with embodiments. For example, the system 1200 can include an inventory manager 1202 for storing inventory information and controlling disposition of inventory, an inventory handler controller 1204 for controlling inventory handlers to retrieve and displace inventory, and a network 1206 that facilitates communication between components of the system.

The inventory manager 1202 can include a processor 1210 and memory 1212 for maintaining inventory data and responding to requests to retrieve or displace inventory items, and for maintaining various modules. For example, a user input/output (I/O) module can facilitate receiving instructions from a user for retrieving, stowing, or moving inventory items in an inventory facility, and for providing indications to a user. A communication module 1216 can facilitate communicating instructions to and receiving information from sensors, external networks, input/output devices, and one or more inventory handler controllers. An inventory routing module 1218 can be operable to cause one or more inventory handler controllers, such as the inventory handler controller 1204, to retrieve and displace inventory items.

The inventory handler controller 1204 can also include a controller processor 1220 and controller memory 1222 for maintaining some or all of the following modules. A contact detection module 1224 can, in conjunction with sensed data and/or stored data, determine locations of contact surfaces of inventory items suitable for engagement by the gripping elements of an inventory handler. A shear control module 1226 can, in conjunction with force sensors and/or impedance controllers in actuators of an inventory handler, control said actuators for generating sufficient shear force in gripping elements to generate adhesive forces. A displacement control module 1228 can be operable to control robotic displacement of an inventory handler, e.g. for moving the inventory handler into position to grasp an inventory item, or to move an inventory handler with a grasped item from a first location to a second location. A sensor module 1230 is operable to control one or more sensors that provide data to the inventory handler controller and/or to the inventory manager, such as visual data concerning the position of an inventory item relative to the inventory handler, visual data concerning surface features of an inventory item for assessing suitability of contact surfaces on the inventory item, force data concerning the separating force generated between gripping elements of an inventory handler, force data concerning a normal force exerted by the inventory handler on an inventory item or by a hanging inventory item adhered to the inventory handler, or other sensed data. The contact detection module 1224 and/or the inventory manager 1202 may be configured to use the visual data obtained by the sensor module 1228 for generating a three-dimensional model of an inventory item, and for using the three-dimensional model for identifying two or more sufficiently flat regions of the inventory item for use as contact surfaces for gripping elements. Suitable methods and systems for processing visual data to assemble such three-dimensional models are disclosed in, e.g., Rico Jonschkowski et al., "*Probabilistic Multi-Class Segmentation for the Amazon Picking Challenge,*" *Technical Report RBO*-2016-01, *Department of Computer Engineering and Microelectronics, Technische Universität Berlin*, 2016, which is hereby incorporated by reference.

Figure 13:
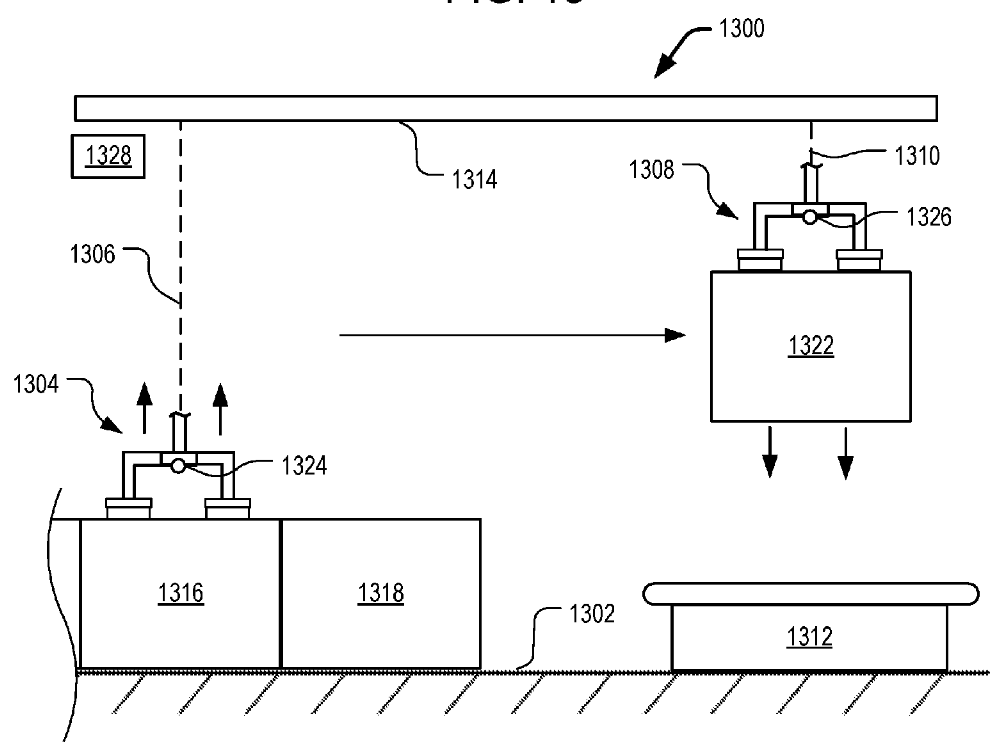
FIG. 13 is a simplified schematic diagram of an inventory system utilizing inventory handlers for manipulating inventory, in accordance with embodiments.

FIG. 13 is a simplified schematic diagram of an inventory system 1300 utilizing inventory handlers 1304, 1308 for manipulating inventory, in accordance with embodiments. The system 1300 is operable to move inventory items, e.g. items 1316, 1318, 1322, between locations in a facility 1302. For example, under the control of an inventory manager 1328, a first inventory handler 1304 can be controlled to retrieve an inventory item 1316. A sensor module 1324 associated with the first inventory handler 1304 can, in conjunction with the inventory controller 1328, detect a location and locate contact surfaces of the inventory item 1316. The first inventory handler 1304 can adhere to the inventory item, and can be lifted by any suitable vertical actuating assembly 1306, such as a robotic arm, cable and crane, drone, or comparable means. Said vertical actuating assembly 1306 may also be movably connected with, for example, a horizontal displacement assembly 1314 such as a robotic arm, crane, track-mounted robotic unit, drone, or comparable means. Thus, the first inventory handler 1303 may be operable to lift the inventory item 1316 directly upward until it clears the adjacent inventory item 1318, and then horizontally displace the inventory item 1316.

A second inventory handler 1308 is shown, which may also be connected by a vertical displacement assembly 1310 with the horizontal displacement assembly 1314. Under the control of the inventory manager 1328, the second inventory handler 1308 is operable to horizontally and vertically displace an inventory item 1322 to a destination 1312. The second inventory handler 1308 can lower the inventory item 1322 to the destination 1312 and then fully release the inventory item before returning to a standby location or being dispatched by the inventory manager 1328 to retrieve another inventory item. A second sensor module 1324 can be operable to collect visual and/or force data, such as a normal force exerted between the inventory item 1322 and the second inventory handler 1308 and an environment proximate to the second inventory handler 1308. The data concerning the normal force may be used, for example, to determine when the inventory item 1322 has been fully placed at the destination 1312 such that it is safe to release the inventory item from the second inventory handler 1308.

Figure 14:
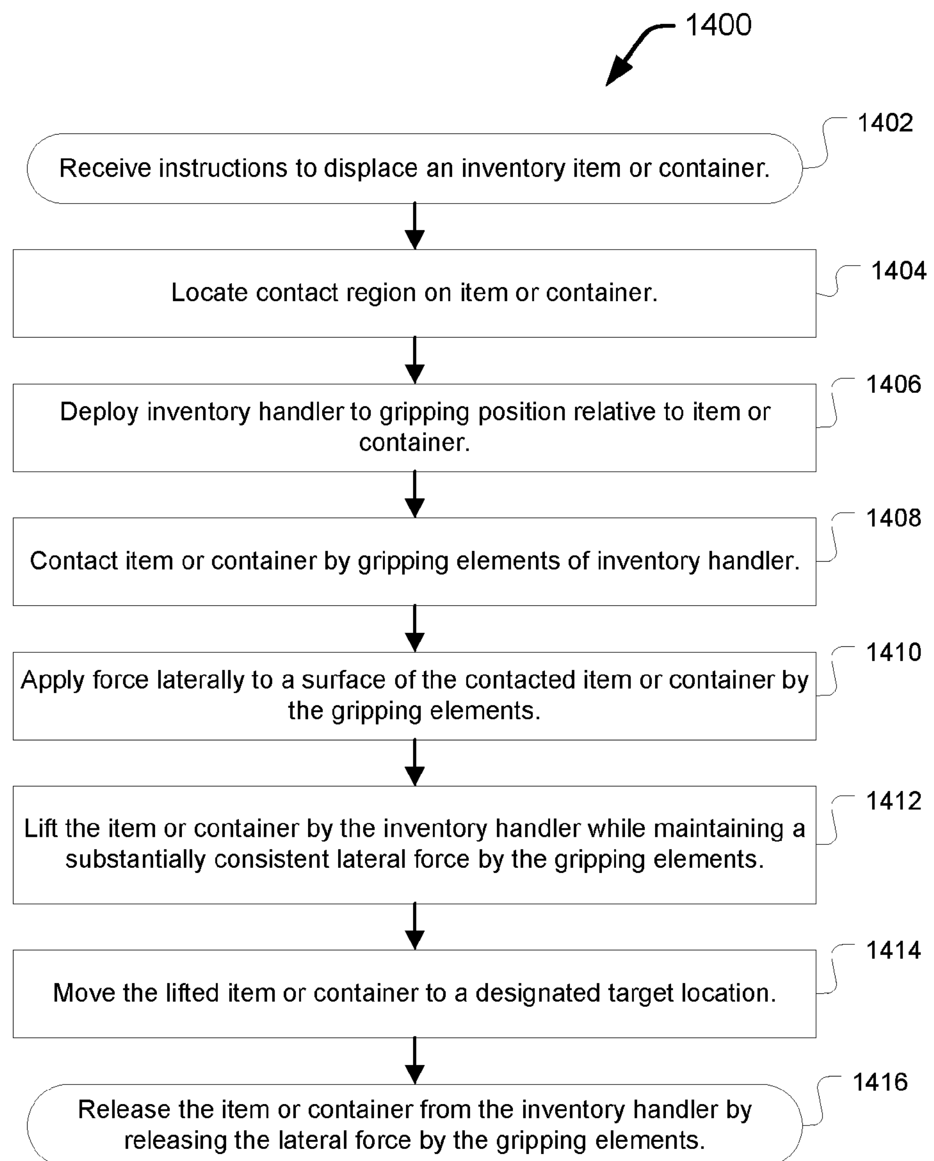
FIG. 14 illustrates an example process for handling an inventory item or container, in accordance with embodiments.

FIG. 14 illustrates a first example process 1400 for handling an inventory item or container, in accordance with embodiments. Steps shown in the process 1400 can be implemented in accordance with systems for controlling one or more inventory handlers in an inventory system, for example as shown in systems 1200 and 1300 shown in FIGS. 12 and 13. In some embodiments, instructions can be received to displace an inventory item or a container containing an inventory item (act 1402). In response to the instructions, a contact region comprising at least two contact surfaces can be located on the container, e.g. by visual sensing or by way of stored data indicating a contact surface position relative to a container (act 1404). An inventory handler having gripping elements can be deployed to a gripping position with respect to the inventory item or container (act 1406) and the gripping elements can be put into contact with the contact region of the inventory item or container (act 1408). Next, the inventory handler can exert a lateral separating force between the gripping elements in contact with the inventory item, producing shear at anisotropically adhesive surfaces of the gripping elements where they contact the inventory item, such that an adhesive effect is produced between the adhesive surfaces and the inventory item that produced an adhesive force (act 1410). The inventory handler can then lift the inventory item or container using the adhesive force while maintaining shear at the interface, e.g. by maintaining a substantially consistent lateral separating force between the gripping elements while the inventory item or container is retained (act 1412). The retained inventory item or container can be lifted and moved to a destination while retained, according to the received instructions, e.g. from a stowed location to a processing location, from an intake location to a stowed location, or between any other processing locations in an inventory facility (act 1414). The retained inventory item or container can be fully released by the inventory handler at the destination by releasing the lateral separating force between the gripping elements (act 1416).

FIG. 15 illustrates a second example process 1500 for handling an inventory item or container, in accordance with embodiments. Steps shown in the process 1500 can be implemented in accordance with systems for controlling one or more inventory handlers in an inventory system, for example as shown in systems 1200 and 1300 shown in FIGS. 12 and 13. In some embodiments, instructions can be received to displace an inventory item or a container containing an inventory item (act 1502). In response to the instructions, past usage information concerning the gripping elements of an inventory handler can be retrieved, such as a number of lifting operations conducted by the gripping elements since a prior servicing or replacement time or date, or any logged exceptions or warnings concerning performance of the gripping elements (act 1504). If the past usage information contains any parameters that exceed a predetermined threshold (act 1506), the system can generate a warning indicating that the gripping elements should be replaced or serviced (act 1508). Examples of such parameters may include but are not limited to: a previous lifting failure, excessive number of lifting events, excessive time since a replacement, or excessive number of lifting events above a predetermined weight. If no threshold is exceeded, the inventory handler can proceed to grasp the inventory item by contacting the inventory item or container by the gripping elements of the inventory handler (act 1510). The inventory handler can engage and retain the inventory item as described above by applying a lateral separating force on the surface of the contacted inventory item or container with the anisotropically adhesive surfaces of the gripping elements (act 1512). The system can subsequently monitor the laterally applied force (act 1514). The laterally applied force will remain substantially consistent for a given displacement of the gripping elements when the gripping elements are adhered to the item or container, providing for minor variation due to load settling or deformation. If the laterally applied force drops below a predetermined threshold (act 1516), the system can generate a warning indicating that the gripping operation has failed (act 1518). When the item or container is lifted, a normal force will be exerted on the inventory handler by the item or container. This normal force exerted between the inventory handler and the inventory item or container can be monitored as the inventory handler engages and lifts the inventory item or container (act 1520). The system can determine whether, at any point, the normal force drops below a predetermined threshold, which may be indicative of a failure by the inventory handler to retain the inventory item or container, or an indication that the inventory item may have collided with an object (act 1522). The predetermined threshold may be based on a weight of the particular inventory item or container, which may be a stored value or may be determined at the initial time of lifting. If the normal force drops below the predetermined threshold, the system can generate a warning indicating a failed lifting operation or an exception in the lifting operation (act 1524). Otherwise, the system can continue displacing the inventory item or container according to the received instructions (act 1526).

Figure 16:
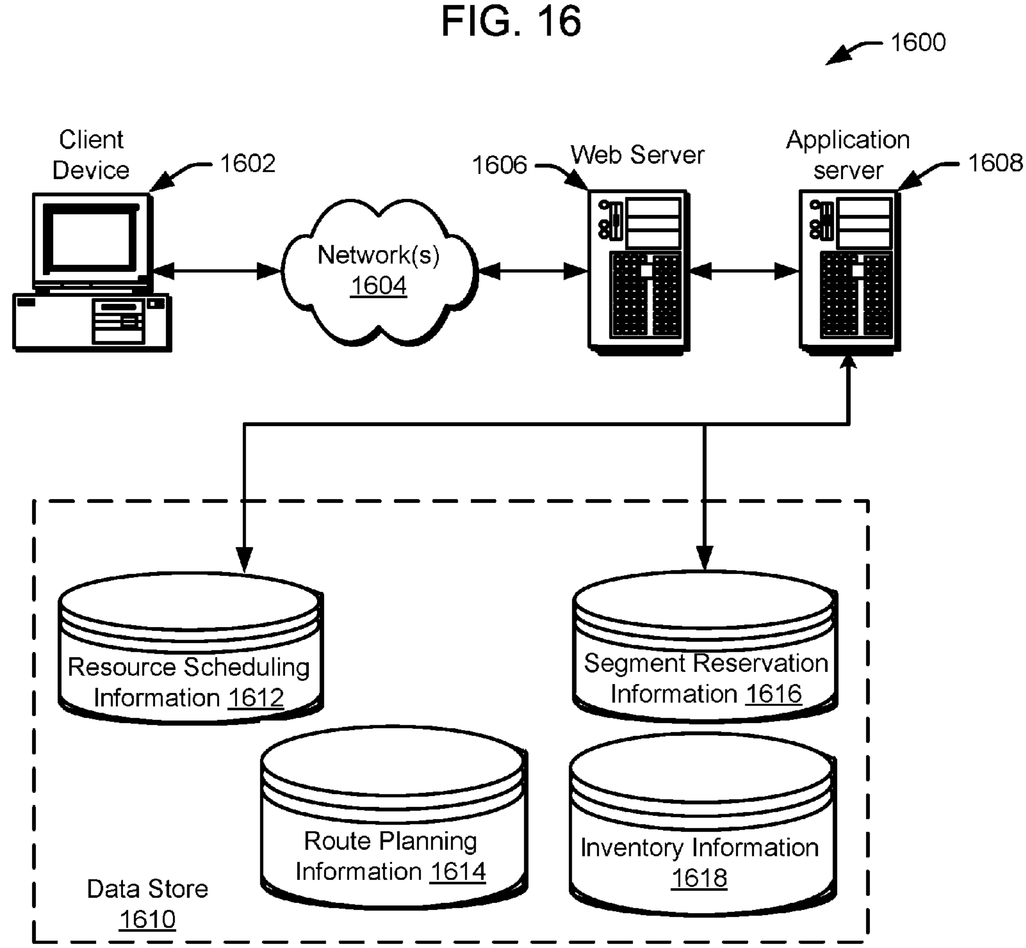
FIG. 16 illustrates an environment in which various features of an inventory system can be implemented, in accordance with at least one embodiment.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term “data store” refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language (“HTML”), Extensible Markup Language (“XML”) or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing information which can be used by modules described herein, such as resource scheduling information 1612, route planning information 1614, segment reservation information 1616, and/or inventory information 1618. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term “connected” is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system for manipulating inventory in a facility, the inventory management system comprising:

a robotic inventory handler comprising:

a first gripping element configured to grip an inventory item in response to the first gripping element being loaded in shear;

a second gripping element configured to grip the inventory item in response to the second gripping element being loaded in shear; and a lifting assembly to which the first and second gripping elements are mounted, the lifting assembly being configured to:

generate a first shear force for application to the inventory item by the first gripping element, the first shear force being oriented to load the first gripping element in shear;

generate a second shear force for application to the inventory item by the second gripping element, the second shear force being oriented to load the second gripping element in shear, the first and second shear forces being directed away from each other so as to induce surface tension in the inventory item; and move the inventory item via the first and second gripping elements gripping the inventory item; and an inventory management component including at least one processor and tangible non-transitory memory storing instructions executable by the at least one processor to cause the robotic inventory handler to:

bring the first and second gripping elements into contact with the inventory item;

generate the first and second shear forces to cause the first and second gripping elements to grip the inventory item; and move the inventory item via the first and second gripping elements gripping the inventory item.

2. The inventory management system of claim 1, wherein:

the first gripping element comprises a first anisotropic adhesive surface configured to generate a first adhesive force in response to being loaded in shear;

the second gripping element comprises a second anisotropic adhesive surface configured to generate a second adhesive force in response to being loaded in shear; and the first and second gripping elements are configured to grip the inventory item by causing the first and second anisotropic adhesive surfaces to adhere to the inventory item by the first and second shear forces.

3. The inventory management system of claim 1, wherein:

bringing the first and second gripping elements into contact with the inventory item comprises bringing the first and second gripping elements into contact with a single substantially flat or concave side of an inventory item.

4. The inventory management system of claim 1, wherein:

generating the first and second shear forces further comprises providing a passive elastic stabilizer configured for accommodating changes in a separation distance between the first and second gripping elements by preventing the first and second shear forces from falling below a predetermined threshold value in response to the changes in the separation distance.

5. The inventory management system of claim 1, wherein the inventory handler further comprises a horizontal displacement assembly connected with the lifting assembly, and wherein the inventory management component is further configured to:

receive instructions to displace the inventory item;

cause the robotic inventory handler to lift the inventory item from a first location;

cause the horizontal displacement assembly to horizontally displace the inventory handler to the second location based on the received instructions; and cause the inventory handler to release the inventory item at the second location by releasing the first and second shear forces.

6. The inventory management system of claim 1, wherein the lifting assembly is further configured to generate a virtual spring force, the virtual spring force configured for preventing the first and second shear forces from falling below a predetermined threshold value.

7. The inventory management system of claim 6, wherein the robotic inventory handler further comprises an impedance controller, the impedance controller being operable to generate the virtual spring force.

8. The inventory management system of claim 1, further comprising:

one or more sensors operable to obtain visual data concerning the inventory item, and wherein the inventory management component is further configured to:

obtain the visual data concerning the inventory item via the one or more sensors;

identify one or more contact surfaces of the inventory item suitable for receiving the first and second gripping elements based in part on the visual data; and cause the robotic inventory handler to bring the first and second gripping elements into contact with the one or more contact surfaces.

9. The inventory management system of claim 1, wherein:

causing the robotic inventory handler to bring the first and second gripping elements into contact with the inventory item comprises lowering the gripping elements vertically onto a top surface of the inventory item; and causing the robotic inventory handler to move the inventory item comprises lifting the inventory item vertically.

10. A robotic inventory handler comprising:

a first gripping element configured to grip an inventory item in response to the first gripping element being loaded in shear;

a second gripping element configured to grip the inventory item in response to the second gripping element being loaded in shear; and a lifting assembly to which the first and second gripping elements are mounted, the lifting assembly being configured to:

generate a first shear force for application to the inventory item by the first gripping element, the first shear force being oriented to load the first gripping element in shear;

generate a second shear force for application to the inventory item by the second gripping element, the second shear force being oriented to load the second gripping element in shear, the first and second shear forces being oriented away from a center of the inventory item; and move the inventory item via the first and second gripping elements gripping the inventory item.

11. The robotic inventory handler of claim 10, wherein:

the first gripping element comprises a first anisotropic adhesive surface;

the second gripping element comprises a second anisotropic adhesive surface; and each of the first and second anisotropic adhesive surfaces is operable to produce at least 5 $N/cm^2$ of adhesive force when subjected to shear of 1 $N/cm^2$.

12. The robotic inventory handler of claim 10, wherein the lifting assembly comprises:

a first mechanical linkage connected with the first gripping element;

a second mechanical linkage connected with the second gripping element; and at least one actuator configured to displace the first mechanical linkage and the second mechanical linkage away from one another for generating the first and second shear forces.

13. The robotic inventory handler of claim 12, wherein the at least one actuator is configured to rotate the first mechanical linkage and the second mechanical linkage with respect to one another.

14. The robotic inventory handler of claim 10, further comprising:

a first rotatable element connected with the first gripping element, the first gripping element being disposed about a first convex surface of the first rotatable element;

a second rotatable element connected with the second gripping element, the second gripping element being disposed about a second convex surface of the second rotatable member; and at least one actuator configured to rotate the first and second rotatable elements in opposite directions from each other for generating the first and second shear forces.

15. The robotic inventory handler of claim 10, wherein:

the first gripping element comprises a first substrate and a first anisotropically adhesive surface connected with the first substrate;

the second gripping element comprises a second substrate and a second anisotropically adhesive surface connected with the second substrate; and the first and second substrates are deformable, such that the first and second gripping elements can conform to irregular surfaces by deforming the first and second substrates.

16. The robotic inventory handler of claim 10, wherein:

the first gripping element comprises a first structural portion and a first removable portion removably connected with the first structural portion, the first removable portion comprising a first anisotropically adhesive surface and a first substrate; and the second gripping element comprises a second structural portion and a second removable portion removably connected with the second structural portion, the second removable portion comprising a second anisotropically adhesive and a second substrate.

17. A computer-implemented method, comprising:

receiving, at an inventory management component, a request to move an inventory item;

causing a robotic inventory handler to engage the inventory item with first and second gripping elements, the first gripping element being configured to grip the inventory item in response to the first gripping element being loaded in shear, and the second gripping element being configured to grip the inventory item in response to the second gripping element being loaded in shear;

causing the robotic inventory handler to interact with the inventory item to load the first and second gripping elements in shear and away from each other to cause the first and second gripping elements to grip the inventory item; and causing the robotic inventory holder to move the inventory item while maintaining loading of the first and second gripping elements in shear.

18. The computer-implemented method of claim 17, further comprising:

determining past usage information concerning the first and second gripping elements; and generating a warning for presentation to a user based in part on the past usage information.

19. The computer-implemented method of claim 17, further comprising:

monitoring a lateral force associated with the loading of the first and second gripping elements in shear;

detecting that the lateral force is less than a predetermined threshold associated with a successful gripping operation; and generating a warning for presentation to a user based in part on detecting that the lateral force is less than the predetermined threshold.

20. The computer-implemented method of claim 17, further comprising:

scanning the inventory item by a sensor;

locating one or more contact surfaces on the inventory item suitable for gripping by the first and second gripping elements based in part on the scanning; and causing the robotic inventory handler to contact the inventory item at the one or more contact surfaces based in part on the locating.

* * * * *